United States Patent [19]

Barnette

[11] Patent Number: 5,280,415
[45] Date of Patent: Jan. 18, 1994

[54] ILLUMINATED CHART HOLDER

[76] Inventor: Bobby W. Barnette, P.O. Box 158, Sherman, Tex. 75091

[21] Appl. No.: 897,916

[22] Filed: Jun. 12, 1992

[51] Int. Cl.⁵ .............................................. F21V 7/04
[52] U.S. Cl. .................................. 362/31; 362/27; 362/62; 362/99
[58] Field of Search ................ 362/27, 31, 98, 99, 362/62, 234, 812

[56] References Cited

U.S. PATENT DOCUMENTS

| | | | |
|---|---|---|---|
| 3,215,453 | 11/1965 | Malcolm, Jr. | 362/99 X |
| 3,246,133 | 4/1966 | Hensleigh | 240/2.1 |
| 3,452,188 | 6/1969 | Zidron et al. | 362/99 |
| 3,808,415 | 4/1974 | Hurst | 240/2 |
| 3,949,214 | 4/1976 | Jones et al. | 240/41.35 |
| 4,387,414 | 6/1983 | Hensleigh | 362/31 |
| 4,409,643 | 10/1983 | Frank et al. | 362/157 |
| 4,453,200 | 6/1984 | Trcka et al. | 362/31 |
| 4,561,042 | 12/1985 | Wehner et al. | 362/30 |
| 4,580,196 | 4/1986 | Task | 362/62 |
| 4,751,615 | 6/1988 | Abrams | 362/98 X |
| 4,887,189 | 12/1989 | Garrett | 362/23 |
| 4,998,185 | 3/1991 | DeNigris, Jr. | 362/98 |

Primary Examiner—Stephen F. Husar
Attorney, Agent, or Firm—Dennis T. Griggs

[57] ABSTRACT

An illuminated chart holder for aircraft use has upper and lower light transmitting plates, the upper plate having a flat top surface and a concave-shaped bottom surface, and the lower plate having a flat bottom surface and a convex-shaped top surface, which is shaped to mate with, but to be spaced from, the bottom surface of the upper plate, with the top surface of the upper plate being generally parallel to the bottom surface of the lower plate, the plate assembly being covered on all four sides with reflecting material, and with the assembly of plates having a display portion and a light source pocket; at least one light reflecting surface either above or below the bottom plate in the light source pocket; at least two bulbs of a first color (e.g. white) and at least two bulbs of a second color (e.g. ANVIS green) in the light source pocket; and variable resistors connected to control intensity of the lights.

18 Claims, 3 Drawing Sheets

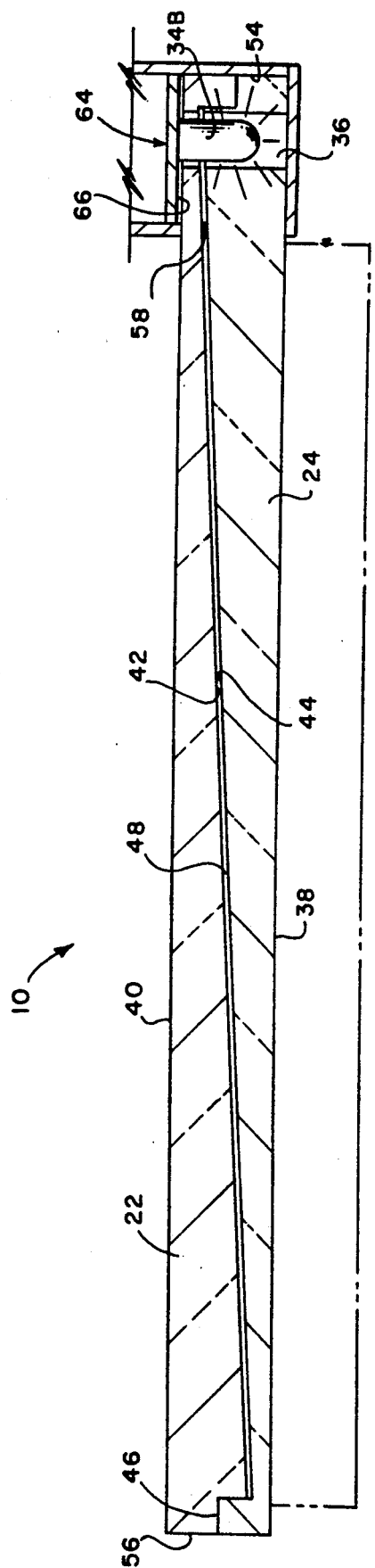
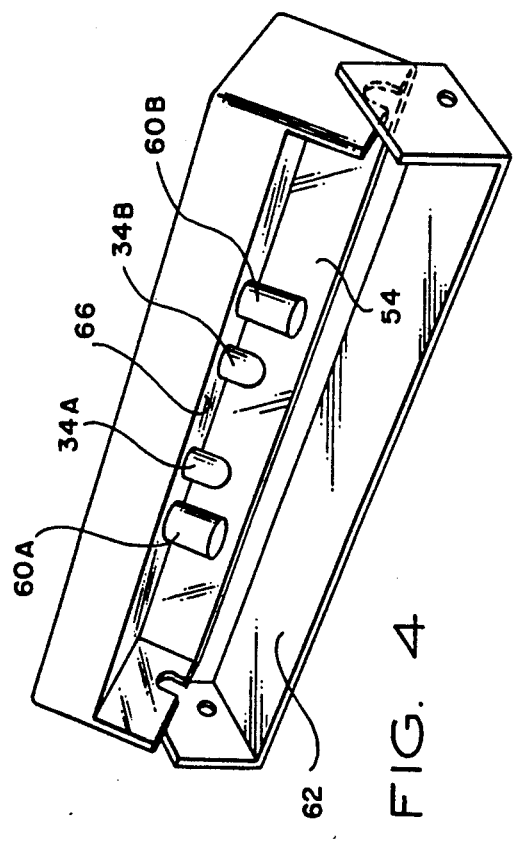
FIG. 3
FIG. 4

ILLUMINATED CHART HOLDER

FIELD OF THE INVENTION

This invention relates generally to holders for aircraft charts and the like, and in particular to an illuminated chart holder which provides uniform illumination to a chart or similar sheet containing navigation information.

BACKGROUND OF THE INVENTION

There are many instances wherein it is desirable to use a holder for navigation charts, maps, data sheets and the like, and to illuminate such materials so that they can be read during night flight operations. During such operations, it is usually desirable to eliminate glare and stray light conditions; consequently, the illumination of such charts may create a problem. Part of the difficulty resides in the inverse square law of illumination from a point source. Without proper corrective measures, a light bulb positioned away from the material to be illuminated and out of the observer's line of sight tends to illuminate those surfaces nearest the bulb to a much greater extent than more remote areas are illuminated. This problem has been addressed, for example, in U.S. Pat. No. 3,246,133, issued to Hensleigh. That patent discloses the use of light distributing plates having complementary conical cavities, with a bulb effectively on the axis of the cone.

A further problem is that it is difficult to provide uniform illumination of a sufficient level at the reading surface, especially of the ANVIS green light required during night operations. It is especially difficult to get appropriate illumination when night vision goggles are being used, where low contrast conditions within the cockpit are essential.

OBJECTS OF THE INVENTION

Conventional equipment for illuminating air navigation charts and the like has generally been unable to provide illumination which is sufficiently uniform and of a sufficiently high level, especially for ANVIS green light illumination. Accordingly, the principal object of the present invention is to provide uniform illumination of light on the surface of a navigation chart and the like, while supplying a sufficiently high light level for both white light and ANVIS green light.

A related object of the present invention is to provide an average brightness level of at least 0.2 foot lamberts of ANVIS green light at a reading surface, with an illumination variation across the reading surface of less than about 4:1, and preferably of less than about 2:1.

Another object of the present invention to provide an average of at least 2 foot lamberts of white light at a reading surface with an illumination variation over the surface of less than about 4:1, and preferably of less than about 2:1.

Still another object of the invention is to selectively provide either at least 0.2 foot lamberts of ANVIS green light or at least 2 foot lamberts of white light at the reading surface of a chart, map or the like in a single holder, while minimizing stray light.

SUMMARY OF THE INVENTION

The foregoing objects are achieved according to the present invention by utilizing at least one bulb of each color in an illuminated chart holder, by having a light transmitting plate assembly covered on its exposed edges with light reflective material, with the plate assembly having upper and lower light transmitting plates, and with at least one light reflecting surface either above or below the bottom plate in a light source pocket of the assembly.

In the preferred embodiment, the illuminated chart holder includes a plate assembly of upper and lower light transmitting plates. The upper light transmitting plate has top and bottom planar surfaces, and the lower light transmitting plate has a flat bottom surface and a flat top surface which is spaced by an air gap from direct contact with the bottom surface of the upper light transmitting plate. The flat top surface of the upper light transmitting plate is generally parallel to the flat bottom surface of the lower light transmitting plate. The external, exposed sides of the plate assembly are covered with a reflective material. At least one light reflecting surface is situated either above or below the bottom plate in the light source pocket. At least two bulbs of a first emission color (e.g., white) and at least two bulbs of a second emission color (e.g., ANVIS green) are inserted in the light source pocket of the assembly. A first variable resistor is connected to control intensity of light emitted from the bulbs of the first color and a second variable resistor is connected to control intensity of light emitted from the bulbs of the second color.

BRIEF DESCRIPTION OF THE DRAWINGS

Operational features and advantages of the present invention will be appreciated by those skilled in the art upon reading the detailed description which follows with reference to the attached drawings, wherein:

FIG. 3 is a cross-section of the upper and lower light transmitting plates and the lamp housing;

FIG. 4 is a perspective view of the lamp housing;

DESCRIPTION OF THE PREFERRED EMBODIMENTS

Figure 1:
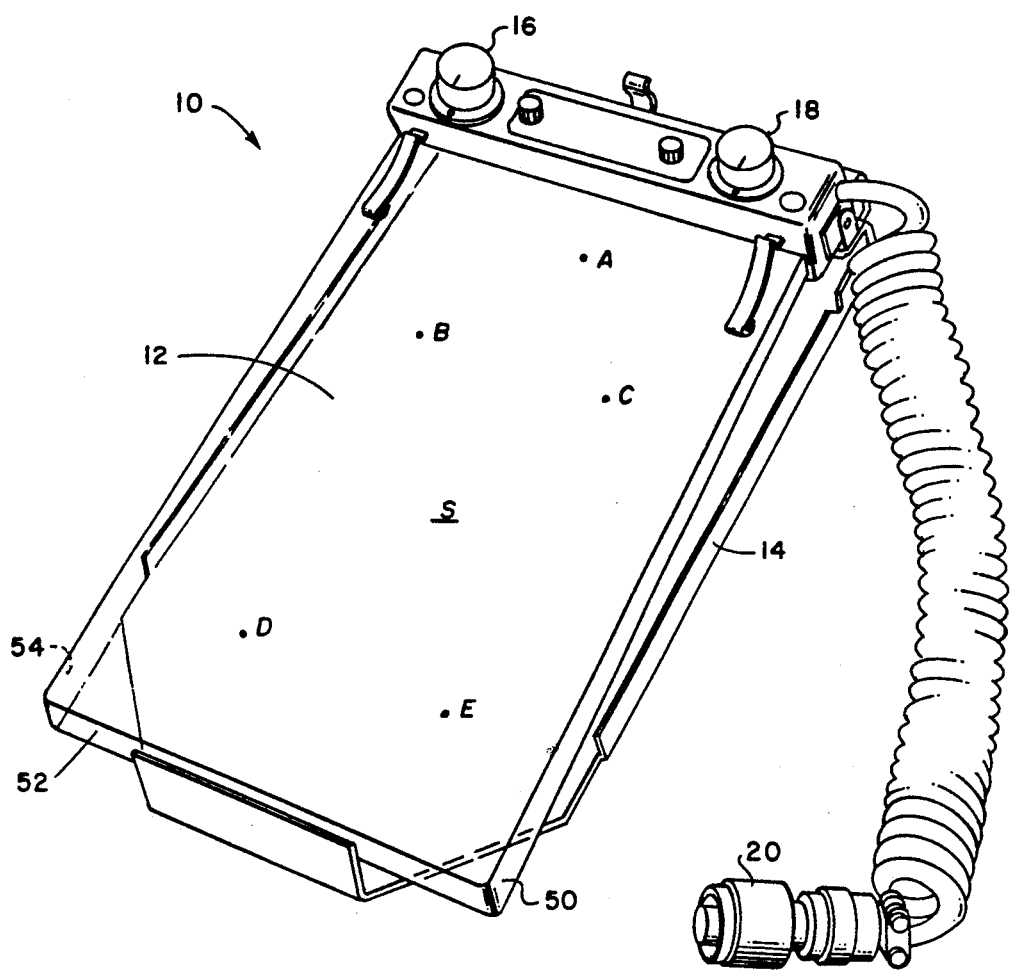
FIG. 1 is a perspective view of one embodiment of an illuminated chart holder constructed according to the present invention.

In the description which follows, like parts are indicated throughout the specification and drawings with the same reference numerals, respectively. The drawings are not necessarily to scale and the proportions of certain parts may be exaggerated to better illustrate details of the invention. The term "aircraft operator" and "observer" as used herein refers to a navigator and a co-pilot as well as a pilot.

FIG. 1 illustrates the illuminated chart holder 10 in perspective, generally from the observer's point of view. A chart (not shown) can be inserted under the upper plate assembly 12 and above the bottom support member 14. The intensity of light across the viewing surface S is generally controlled either by a first variable resistor 16 (ANVIS green light) or by a second variable resistor 18 (white light). A power cable and connector 20 provides electrical connection to a source of D.C. electrical power (not shown).

Figure 2:
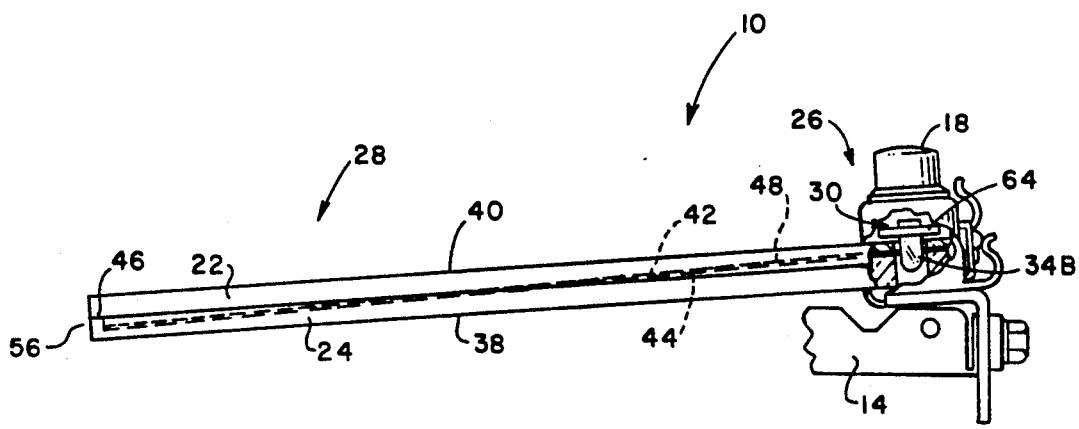
FIG. 2 is a side view, partially in section, of the chart holder of FIG. 1.

FIG. 2 shows the relationship of the upper light transmitting plate 22 and the lower light transmitting plate 24 which make up the plate assembly 12. One end of the plate assembly 12 extends into the lamp housing 26. The plate assembly 12 can be thought of as having a display viewing portion 28 and a light source pocket 30. The end of the plate assembly extending into the lamp housing 26 is the light source pocket 30. FIG. 2 further shows the relationship of the plate assembly 12 with one of the white bulbs 34B extending through a bore 36 in the light source pocket 30 of the assembly. A chart or other sheet material may be inserted against the bottom surface 38 of the lower plate 24.

The upper light transmitting plate 22 has a flat top surface 40 and a flat bottom surface 42, and the lower light transmitting plate 24 has a flat bottom surface 38 and a top surface 44. Those surfaces are indicated by dashed lines, and the periphery 46 is shown with flat surfaces parallel to the flat top and bottom surfaces 38, 40 for ease of assembly. The top surface 44 of the bottom plate 24 is shaped to generally mate with, but to be generally spaced from direct contact with, the bottom surface 42 of the upper light transmitting plate 22.

FIG. 3 shows a cross section of the plate assembly, and in particular shows the relationship of the upper and lower light transmitting plates 22, 24, and the gap 48 between the upper and lower plates 22, 24.

As shown in FIGS. 1, 2 and 3, the plate assembly has three exposed sides 50, 52 and 54 and is made up of upper and lower light transmitting plates 22, 24. The three exposed sides 50, 52 and 54 of the assembly are covered with a light reflective material and the outside of the light reflective material is preferably in turn covered with a light absorbing material to reduce the reflection of stray light in the cockpit.

FIG. 4 shows a perspective view of the lamp housing. The bulbs include two ANVIS green bulbs 60A, 60B and two white bulbs 34A, 34B. A light reflective surface on the inside of the bottom 62 of the lamp housing 26 is preferably utilized below the bottom surface 38 of the lower plate 24 adjacent the light source pocket 30. Alternately, the light reflecting surface could be placed directly on the lower plate 24 in the light source pocket 30. Experiments have shown that, in the light source pocket 30, at least one of the top surface 44 of the lower plate 24 and the area below the bottom surface of the lower plate should be covered with light reflecting material to obtain the desired ANVIS green light intensity.

Figure 5:
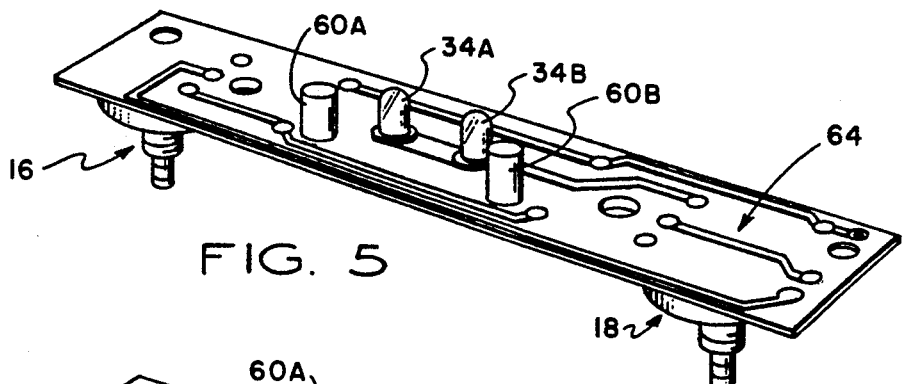
FIG. 5 is an inverted perspective view of a printed circuit board holding four bulbs.
Figure 6:
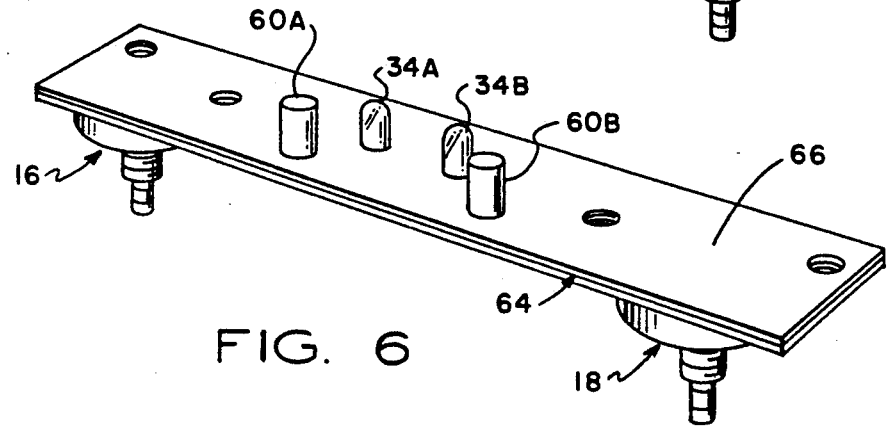
FIG. 6 is an inverted perspective view of the printed circuit board and the light bulbs showing a reflective surface covering the printed circuit board.
Figure 7:
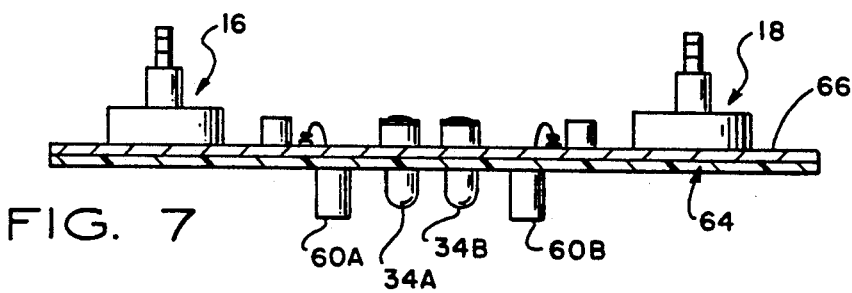
FIG. 7 is a cross section of the printed circuit board assembly of FIG. 6.

FIGS. 5, 6 and 7 show the bulbs mounted on a printed circuit board 64, with the light reflective surface 66 covering the top of the printed circuit board 64.

Figure 8:
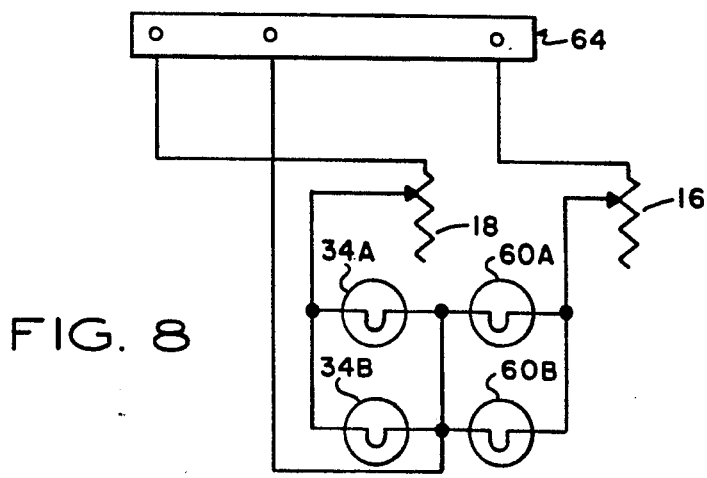
FIG. 8 shows a wiring schematic showing the electric interconnection of the four bulbs and two intensity controlling variable resistors.

FIG. 8 shows an electrical schematic of the bulbs 34A, 34B; 60A, 60B; and variable resistors 16, 18. It can be seen that the two ANVIS green bulbs 60A, 60B are connected in parallel, with their intensity being controlled by a first variable resistor 16. The two white bulbs 34A, 34B are connected in parallel, with their intensity being controlled by a second variable resistor 18.

Sufficient illumination levels, together with the required uniform illumination, are quite difficult to achieve, especially for the ANVIS green light. It has been found that a covering of reflecting material on the three exposed sides 50, 52 and 54 of the assembly, and in the light source pocket 30 on at least one of the top surface of the lower plate and the area below the bottom surface of the lower plate, are required to produce adequate levels of ANVIS green light. In the preferred embodiment, the upper and lower light transmitting plates and reflective surfaces, two bulbs of white and two bulbs of ANVIS green color, and the light reflective material produce the minimum light level and uniform illumination.

In one particular application, in an illumination test with a 90 percent reflective white card placed beneath the plate assemblies, approximately 2 foot lambert average is to be produced across the reading surface in the white mode and a 0.2 foot lambert average in the green (ANVIS) mode. In addition, this application requires that the ratio of the highest luminescence to the lowest luminescence measured over the surface of the white card in either mode shall not exceed about 4:1. Although apparently no other chart holders have currently passed this acceptance standard, the following results, which can be seen to significantly exceed the standard, were obtained with the present invention. In a test of the above described configuration in the white mode, at points A, B, C, D and E as indicated on FIG. 1, foot lambert readings of 3.14, 3.13, 2.90, 2.02 and 1.94, respectively, were measured for an average of 2.63. In a test of the configuration in the ANVIS green mode (at the same positions), levels of 0.270, 0.291, 0.273, 0.288 and 0.301, respectively, were measured at the five points, for an average reading of 0.285 foot lambert.

Although the invention has been described with reference to a specific embodiment, the foregoing description is not intended to be construed in a limiting sense. For example, the position of the bulbs may be varied somewhat from that shown in the figures. In addition, while the description generally refers to a gap between the two mating plates, as shown above, the plates may have peripheral edges which touch for maintaining the desired spacing between the plates. Further, the two mating surfaces of the plates, while generally are described as shaped surfaces, these surfaces may have edge portions parallel to the flat top and bottom surfaces around the periphery for ease of assembly. Various modifications to the disclosed structure, as well as alternative applications, will be suggested to persons in the art by the foregoing specification and illustrations. It is therefore contemplated that the appended claims will cover any such modifications, applications or embodiments which fall within the true scope of the invention.

What is claimed is:

1. An illuminated chart holder comprising, in combination:

a plate assembly, said plate assembly having upper and lower light transmitting plates, said upper light transmitting plate having a flat top surface and a flat bottom surface, and said lower light transmitting plate having a flat bottom surface and a flat top surface generally spaced from direct contact with the flat bottom surface of the upper light transmitting plate, with said flat top surface of said upper light transmitting plate being generally parallel to said flat bottom surface of said lower light transmitting plate, said plate assembly having side edge portions covered by light reflective material, and with said assembly of said upper light transmitting plate and said lower light transmitting plate having a display portion and a light source pocket;

at least one light reflecting surface disposed adjacent said bottom plate in said light source pocket;

at least one bulb of a first emission color disposed in the light source pocket of said plate assembly; and, at least one bulb of a second emission color disposed in the light source pocket of said plate assembly.

2. An illuminated chart holder as defined in claim 1, including:

a first variable resistor connected to control intensity of light emitted from said at least one bulb of the first emission color; and a second variable resistor connected to control intensity of light emitted from said at least one bulb of the second emission color.

3. The illuminated chart holder of claim 1, wherein said surfaces are conical sections having a common axis and none of said bulbs are on the axis.

4. The illuminated chart holder of claim 1, wherein said first color is white and said second color is green.

5. The illuminated chart holder of claim 1, wherein said light reflecting material is covered with a light absorbing material.

6. The illuminated chart holder of claim 1, wherein a light reflecting surface is disposed adjacent said bottom surface of said lower plate adjacent said light source pocket.

7. The illuminated chart holder of claim 5, wherein a light absorbing film is disposed above said top surface of said lower plate in said light source pocket.

8. The illuminated chart holder of claim 5, wherein said top surface of said lower plate in said light source pocket is covered with light reflecting material.

9. The illuminated chart holder of claim 1, wherein there is generally an essentially constant spacing between said convex-shaped top surface of said lower light transmitting plate and the concave-shaped bottom surface of the upper light transmitting plate in said display portion.

10. The illuminated chart holder of claim 1, wherein said plates have an area around the periphery in which there is no gap between the plates.

11. The illuminated chart holder of claim 1, wherein there is a light absorbing surface above said upper plate in said light source pocket.

12. An illuminated chart holder comprising, in combination:

a plate assembly, said assembly having upper and lower light transmitting plates, said upper light transmitting plate having a flat top surface and a concave-shaped bottom surface, and said lower light transmitting plate having a flat bottom surface and a convex-shaped top surface, which convex-shaped top surface is shaped to generally mate with, but to be generally spaced from direct contact with, the shaped bottom surface of the upper light transmitting plate, with said flat top surface of said upper light transmitting plate being generally parallel to said flat bottom surface of said lower light transmitting plate, said plate assembly having side edge portions covered by light reflective material, and with said assembly of said upper light transmitting plate and said lower light transmitting plate having a display portion and a light source pocket;

at least one light reflecting surface disposed adjacent said bottom plate in said light source pocket;

at least one bulb disposed in said light source pocket of said assembly; and a first rheostat connected to control intensity of light emitted from said at least one bulb.

13. An illuminator for providing information to an aircraft operator, said illuminator comprising:

a plate assembly, said plate assembly having upper and lower light transmitting plates, said upper light transmitting plate having a flat top surface and a concave-shaped bottom surface, and said lower light transmitting plate having a flat bottom surface and a convex-shaped top surface, the convex-shaped top surface being shaped to generally mate with, but to be generally spaced from direct contact with, the shaped bottom surface of the upper light transmitting plate, with said flat top surface of said upper light transmitting plate being generally parallel to said flat bottom surface of said lower light transmitting plate, said plate assembly having side edge portions covered by light reflecting material, and with said assembly of said upper light transmitting plate and said lower light transmitting plate having a display portion and a light source pocket;

at least one light reflecting surface disposed adjacent said bottom plate in said light source pocket;

two bulbs of a first color and two bulbs of a second color disposed within four holes in said lower plate, respectively;

a first rheostat connected to control intensity of light emitted from said bulbs of a first color; and a second rheostat connected to control intensity of light emitted from said bulbs of a second color.

14. The illuminator of claim 13, wherein said first color is white and said second color is green.

15. The illuminator of claim 13, wherein said light reflecting material covering said sides of said plate assembly is in turn covered with a light absorbing material.

16. The illuminator of claim 13, wherein a light reflecting surfaces is utilized below said bottom surface of said lower plate adjacent said light source pocket.

17. The illuminator of claim 13, wherein a light absorbing material is utilized above said top surface of said lower plate in said light source pocket.

18. The illuminator of claim 13, wherein said shaped surfaces are conical sections having a common axis and none of said bulbs are on the axis.

* * * * *